United States Patent
Rice et al.

(10) Patent No.: US 10,412,235 B2
(45) Date of Patent: Sep. 10, 2019

(54) IDENTIFICATION BIT MEMORY CELLS IN DATA STORAGE CHIP

(75) Inventors: Huston W. Rice, Vancouver, WA (US); David B. Novak, Philomath, OR (US); Erik D. Ness, Vancouver, WA (US); Brendan Hall, Leixlip (IE)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 14/343,396

(22) PCT Filed: Sep. 30, 2011

(86) PCT No.: PCT/US2011/054162
§ 371 (c)(1),
(2), (4) Date: Mar. 7, 2014

(87) PCT Pub. No.: WO2013/048430
PCT Pub. Date: Apr. 4, 2013

(65) Prior Publication Data
US 2014/0211241 A1    Jul. 31, 2014

(51) Int. Cl.
| | |
|---|---|
| H04N 1/00 | (2006.01) |
| B41J 2/175 | (2006.01) |
| H01M 10/42 | (2006.01) |
| H01M 6/50 | (2006.01) |
| H04L 9/32 | (2006.01) |

(Continued)

(52) U.S. Cl.
CPC ........ H04N 1/00037 (2013.01); B41J 2/1753 (2013.01); B41J 2/17546 (2013.01); B41J 29/393 (2013.01); H01M 6/5066 (2013.01); H01M 10/4221 (2013.01); H04L 9/3278 (2013.01); G01R 31/382 (2019.01); H01M 10/4257 (2013.01)

(58) Field of Classification Search
CPC .................................................... B41J 2/17546
See application file for complete search history.

(56) References Cited

U.S. PATENT DOCUMENTS 5,283,613 A * 2/1994 Midgley, Sr. ........ G03G 15/553
                                                          399/111
6,019,461 A * 2/2000 Yoshimura ........... B41J 2/17546
                                                          347/19

(Continued)

FOREIGN PATENT DOCUMENTS

| CN | 1558829 | 12/2004 |
| JP | 2006198774 | 8/2006 |

(Continued)

OTHER PUBLICATIONS

Extended European Search Report, dated Oct. 20, 2016, Application No. 11873110.8.

*Primary Examiner* — Nicholas Pachol
(74) *Attorney, Agent, or Firm* — HP Inc. Patent Department

(57) ABSTRACT

In an embodiment, an authentication system includes a supply device having a data storage chip with identification (ID) bit memory cells. The ID bit memory cells comprising a measured cell, pointer cells to store address information that points to the measured cell, and analog cells that store factory-measured analog information about the measured cell.

25 Claims, 4 Drawing Sheets

(51) Int. Cl.
*B41J 29/393* (2006.01)
*G01R 31/382* (2019.01)

(56) References Cited

U.S. PATENT DOCUMENTS

| | | | |
|---|---|---|---|
| 6,993,130 B1* | 1/2006 | Fernandez | G06F 21/73 |
| | | | 257/296 |
| 7,044,574 B2 | 5/2006 | Croley et al. | |
| 7,212,637 B2 | 5/2007 | Salisbury | |
| 2002/0085847 A1* | 7/2002 | Yoshida | G03G 15/55 |
| | | | 399/12 |
| 2002/0162014 A1 | 10/2002 | Przydatek et al. | |
| 2004/0181681 A1* | 9/2004 | Salisbury | 713/200 |
| 2007/0081842 A1 | 4/2007 | Ehrhardt | |
| 2008/0021837 A1 | 1/2008 | Chang et al. | |
| 2008/0022874 A1* | 1/2008 | Silverbrook | B41J 2/14427 |
| | | | 101/330 |
| 2008/0143476 A1 | 6/2008 | Kwok et al. | |
| 2008/0267408 A1* | 10/2008 | Hsieh | H04L 9/3271 |
| | | | 380/278 |
| 2009/0083833 A1* | 3/2009 | Ziola | G06F 21/31 |
| | | | 726/2 |
| 2009/0295366 A1 | 12/2009 | Cehelnik | |
| 2010/0325704 A1 | 12/2010 | Etchegoyen | |
| 2010/0328405 A1 | 12/2010 | Ness | |
| 2011/0175703 A1 | 7/2011 | Benkley, III | |
| 2012/0002982 A1* | 1/2012 | Katayama | G03G 15/50 |
| | | | 399/12 |
| 2012/0020678 A1* | 1/2012 | Wilsher | G03G 15/553 |
| | | | 399/12 |
| 2013/0083096 A1* | 4/2013 | Rice | G06F 21/44 |
| | | | 347/2 |

FOREIGN PATENT DOCUMENTS

| | | |
|---|---|---|
| KR | 10-0565806 | 3/2006 |
| TW | 200629858 | 8/2006 |
| TW | 201106157 A | 2/2011 |
| WO | WO-2009/114019 | 9/2009 |
| WO | WO-2011088248 A1 | 7/2011 |

* cited by examiner

IDENTIFICATION BIT MEMORY CELLS IN DATA STORAGE CHIP

BACKGROUND

Many systems have replaceable components that are integral to the functioning of the system. The replaceable components are often devices that contain consumable material that is depleted with each use of the system. Such systems may include, for example, cell phones that use replaceable batteries, medical systems that dispense medicine from replaceable supply devices, printing systems that dispense fluids (e.g., ink) or toners from replaceable supply cartridges, and so on. Verifying that a replaceable device is an authentic device from a legitimate manufacturer can help a system user avoid problems associated with the unintended use of a defective and/or counterfeit device.

BRIEF DESCRIPTION OF THE DRAWINGS

The present embodiments will now be described, by way of example, with reference to the accompanying drawings, in which.

DETAILED DESCRIPTION

Overview of Problem and Solution

Figure 1:
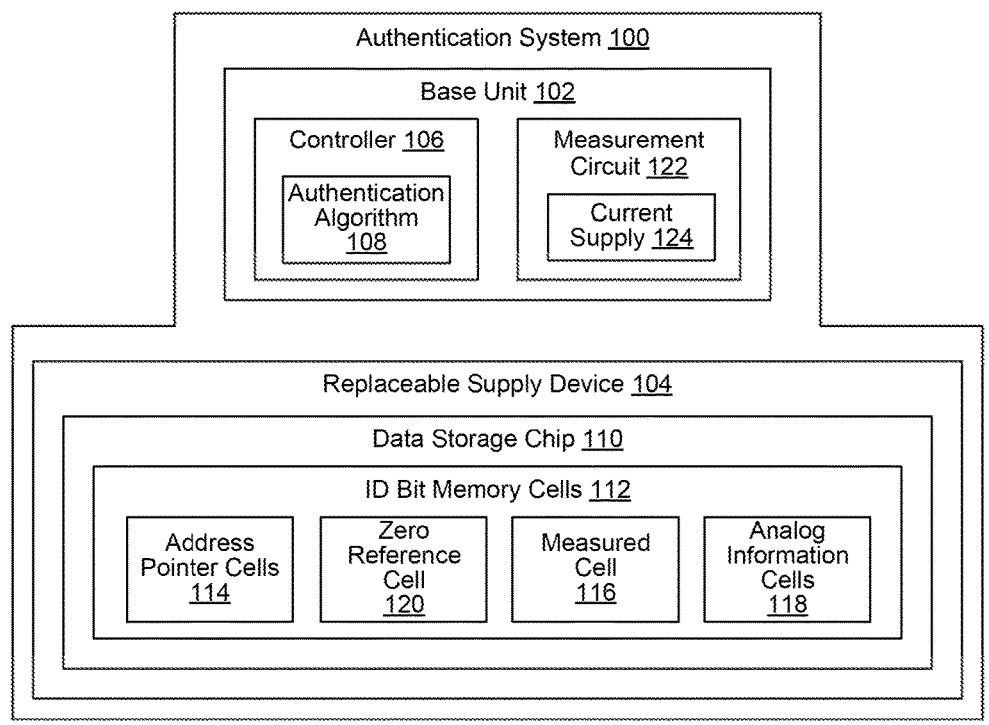
FIG. 1 shows an authentication system that includes a base unit and a replaceable supply device, according to an embodiment.

As noted above, verifying the authenticity of replaceable devices for use in certain systems can help system users avoid problems associated with the unintended use of defective and/or counterfeit devices. For example, in printing systems that employ replaceable toner or ink cartridges, the inadvertent use of a counterfeit cartridge can result in various problems ranging from poor quality printouts to leaky cartridges that can damage the printing system.

Prior methods of authenticating a replaceable device have included storing identification data in a data chip on the device and then verifying that the identification data is correct when the device is inserted into the system. For example, in a printing system a print cartridge can incorporate a data storage chip having identification (ID) bit memory cells that are pre-programmed with digital values of logic "1" (high) or logic "0" (low). When a print cartridge is inserted into the printer system, a printer controller determines whether or not the cartridge is authentic by reading (i.e., measuring) the logic values in the ID bit memory cells and comparing them with a threshold value to see if they match expected logic values that were pre-programmed into the memory cells. Thus, the threshold criteria used in this authentication method merely determine whether the ID bit memory cells contain logic high values or logic low values. However, ID bit cells that have significant electrical defects or that have been inappropriately modified (e.g., by a counterfeiter) will also return either a logic high or logic low value when measured. As a result, this method of authentication does not always adequately detect damaged and/or inappropriately modified ID bits, which can lead to the improper authentication of some replaceable devices.

Embodiments of the present disclosure provide robust authentication systems and methods that authenticate replaceable system supply devices, in general, through the use of analog serial numbers that are uniquely associated with replaceable devices. An analog serial number encoded in a supply device's data storage chip contains information about a specific physical parameter of the chip that uniquely identifies the supply device via the chip. During fabrication of the data storage chip, a physical parameter such as an electrical characteristic is measured for a particular memory cell within a string of ID bit memory cells on the chip. The measured analog value of the physical parameter is digitally encoded into some cells of the string of ID bit memory cells. After fabrication, during typical operation in the field, an authentication system receiving the replaceable device locates the particular memory cell through a stored address pointer in the ID bit memory cells, and it measures the value of the physical parameter of the particular memory cell. The system compares the value of the physical parameter measured in the field with the value measured and encoded into the ID bit memory cells during fabrication. If the value measured in the field matches the value encoded during fabrication (i.e., within a given tolerance level), the authentication system authenticates the replaceable supply device. If the values do not match, the authentication system provides a notification (e.g., through a system user interface) that the replaceable supply device is defective, damaged, or otherwise not authentic. In this way, the analog value of a physical parameter measured for a particular memory cell within the ID bit string serves as an analog serial number for the supply device that uniquely identifies the supply device.

In one embodiment, for example, an authentication system includes a supply device that has a data storage chip with identification (ID) bit memory cells. The ID bit memory cells include a measured cell, pointer cells to store address information pointing to the measured cell, and analog cells that store factory analog information about the measured cell. In one implementation, the system also includes a base unit to receive the supply device and a controller integrated into the base unit. An authentication algorithm executable on the controller is to locate the measured cell using the address information, and measure the measured cell for field analog information. The algorithm compares the factory and field analog information, and authenticates the supply device if the factory and field analog information matches.

In another embodiment, a method of authentication includes designating as a measured cell, a particular cell from a string of identification (ID) bit memory cells on a data storage chip, encoding an address of the measured cell into the ID bit memory cells, and measuring an analog value of the measured cell. The method further includes encoding the analog value into the ID bit memory cells.

In another embodiment, a method of authentication includes receiving a replaceable device having identification (ID) bit memory cells and locating an address for a measured cell within the ID bit memory cells. A factory-measured analog value of the measured cell is encoded within the ID bit memory cells, and the measured cell is measured to determine a field-measured analog value of the measured cell. The replaceable device is authenticated if the factory-measured and field-measured analog values match, and a notification is provided that the replaceable device is not authentic if the factory-measured and field-measured analog values do not match.

Illustrative Embodiments

FIG. 1 shows an authentication system 100 that includes a base unit 102 and a replaceable supply device 104, according to an embodiment of the disclosure. The base unit 102 of system 100 includes a controller 106 that typically includes components of a standard computing system such as a processor, memory, firmware, and other electronics for controlling the general functions of the authentication system 100 and for communicating with and controlling supply device 104. In one implementation, controller 106 executes an authentication algorithm 108 to determine the authenticity of the replaceable supply device 104. The supply device 104 includes a data storage chip 110 that has a number of identification (ID) bit memory cells 112 pre-programmed with digital logic values of "1" (high) or "0" (low). The digital values stored in the string of ID bit memory cells 112 typically provide information about properties of the supply device 104. For example, the memory cells 112 may store information that indicates the type of supply device 104, the type of material contained within the supply device, properties and/or usage characteristics of the material contained within the supply device, and so on.

Figure 2:
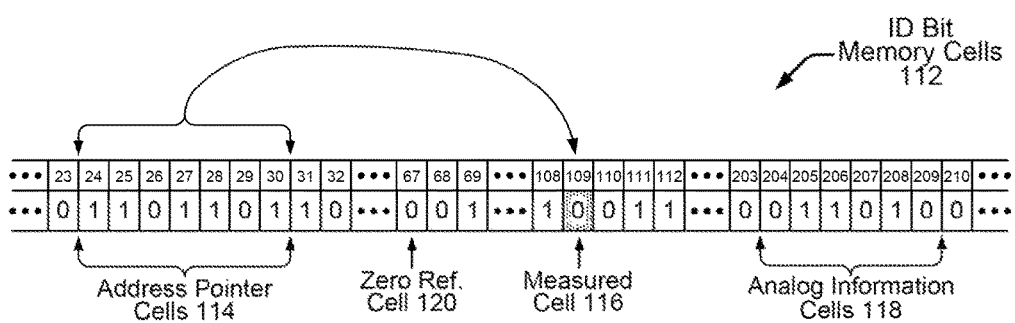
FIG. 2 shows an example of a string of ID bit memory cells that is suitable for implementation in a data storage chip, according to an embodiment.

FIG. 2 shows an example of a string of ID bit memory cells 112 that is suitable for implementation in a data storage chip 110, according to an embodiment of the disclosure. The number of memory cells and their associated address locations shown in the string of ID bit memory cells 112 of FIG. 2 are shown for the purpose of facilitating this description, and are not intended to indicate the actual number of memory cells or address locations that may be implemented in a string of ID bit memory cells 112 within a data storage chip 110. The actual number of memory cells in a string of 10 bit memory cells 112 may vary, but is typically greater than the number of cells shown in FIG. 2. The types of cells making up the string of ID bit memory cells 112 on data storage chip 110 may vary. Furthermore, the string of ID bit memory cells 112 may include more than one type of memory cell. The actual types of ID bit memory cells that may be suitable for implementation on a data storage chip 110 include, but are not limited to, MROM cells, PROM cells, EPROM cells, EEPROM cells, fuses and the like.

The string of ID bit memory cells 112 on data storage chip 110 includes a group of cells referred to as address pointer cells 114. In one embodiment the address pointer cells 114 are at the same address location from one data storage chip 110 to another. In other embodiments, the address pointer cells 114 may be at varying address locations from one data storage chip 110 to another. The number of address pointer cells 114 shown in FIG. 2 is provided for the purpose of discussion only, and is not intended to limit the actual number of cells that may be used as address pointer cells 114. Thus, in other implementations there may be a greater or fewer number of address pointer cells 114 than are shown in FIG. 2. The number of address pointer cells 114 may depend, at least in part, on the total number of memory cells in the string of ID bit memory cells 112.

The address pointer cells 114 are programmed with digital logic values of "1" (high) or "0" (low) during fabrication of the data storage chip 110. The programmed values in the address pointer cells 114 convey an address that points to a particular cell within the string of ID bit memory cells 112, referred to as measured cell 116. The address location of the measured cell 116 that the address pointer cells 114 point to is not the same from one data storage chip 110 to another. However, since the measured cell 116 is one of the cells within the string of ID bit memory cells 112, its address location is limited to those address locations found within the string of ID bit memory cells 112. For example, the address pointer cells 114 shown in FIG. 2 are programmed with digital values of 1101101. These digital bits correspond with the address 109 in the string of ID bit memory cells. Thus, the address pointer cells 114 point to address 109 as the location of the measured cell 116. However, in different data storage chips, the address pointer cells 114 may be programmed with various other digital values pointing to various other address locations within the string of ID bit memory cells 112 for the measured cell 116.

The string of ID bit memory cells 112 on data storage chip 110 also includes a group of cells referred to as analog information cells 118. In different embodiments, the analog information cells 118 may be located at varying address locations from one data storage chip 110 to another. Furthermore, while the analog information cells 118 in FIG. 2 are shown at adjacent address locations, in other embodiments they may be scattered throughout the string of ID bit memory cells 112 such that the address of each analog information cell 118 is not adjacent to the address of a next analog information cell 118.

Analog information cells 118 store analog information about the measured cell 116 in the form of digital logic values, "1" (high) or "0" (low). The analog information typically comprises the measured analog value of an electrical characteristic of the measured cell 116. For example, the analog information may be the analog value of an electrical characteristic such as the voltage across the cell, the impedance of the cell, the resistance of the cell, the capacitance of the cell, the inductance of the cell, some mathematical combination or ratio thereof, and so on. In general, the value of any one or a number of common electrical characteristics of measured cell 116, or combinations or variations thereof, may be encoded (i.e., stored) within analog information cells 118. The number of analog information cells 118 shown in FIG. 2 is provided for the purpose of discussion only, and is not intended to limit the actual number of cells that may be used as analog information cells 118. Thus, in other implementations there may be a greater or fewer number of analog information cells 118 than are shown in FIG. 2. The number of analog information cells 118 used is dependent in part on the degree of resolution desired for the encoded analog information.

During fabrication of the data storage chip 110, the value of a physical parameter such as an electrical characteristic (i.e., the analog information) is measured for the measured cell 116. In one embodiment, this "factory-measured" value of the electrical characteristic is encoded directly into the analog information cells 118. The factory-measured value of the electrical characteristic encoded into the analog information cells 118 provides an analog serial number that is uniquely associated with the data storage chip 110 of the particular replaceable supply device 104 in which the chip is integrated.

Referring to FIGS. 1 and 2, in one embodiment this unique association enables the authentication algorithm 108 executable on controller 106 of base unit 102 to determine the authenticity of the replaceable supply device 104. After fabrication and during normal operation in the field, when the authentication system 100 receives a replaceable supply device 104, the authentication algorithm 108 determines if the device 104 is authentic. More specifically, the authentication algorithm 108 executes to control a measurement circuit 122 that measures the value of the electrical characteristic of the measured cell 116 during normal operation in the field. In one embodiment, the measurement circuit 122 can be an analog to digital converter circuit, and may include a current supply 124. The algorithm 108 first locates the address of the measured cell 116 by reading the address from the address pointer cells 114. The algorithm 108 then controls the measurement circuit 122 to supply current from current supply 124 to the measured cell 116, and to measure the value of the same electrical characteristic of the measured cell 116 that was previously measured in the factory during fabrication. Thus, in one embodiment an electrical characteristic of a measured cell 116 is measured first during fabrication to determine a "factory-measured" value, and it is measured again after fabrication during normal operation in the field to determine a "field-measured" value.

In addition to measuring the measured cell 116 for a field-measured value of the electrical characteristic, the authentication algorithm 108 accesses the factory-measured value of the electrical characteristic previously encoded into the analog information cells 118 within the string of ID bit memory cells 112. The algorithm 108 compares the field-measured value and the previously encoded factory-measured value to determine if they match. If the field-measured value matches the factory-measured value (i.e., within a given tolerance level), the authentication algorithm 108 authenticates the replaceable supply device. If the values do not match, however, the authentication algorithm 108 provides a notification (e.g., through a user interface of the authentication system 100) that the replaceable supply device 104 is defective, damaged, or otherwise not authentic. In this way, the analog value of an electrical characteristic measured for a particular memory cell within the ID bit string serves as an analog serial number for the supply device that uniquely identifies the supply device, enabling verification of the authenticity of the device.

In another embodiment, the value of the electrical characteristic for measured cell 116 determined during fabrication of the data storage chip 110 is not directly encoded into the analog information cells 118. Instead, a mathematical variation of this value is encoded into the analog information cells 118. One example of such a mathematical variation of the electrical characteristic value is a ratio of this value with respect to the same value measured for a zero reference cell 120. In this embodiment, a zero reference cell 120 is included in the string of ID bit memory cells 112 on data storage chip 110 The zero reference cell 120 is a designated cell programmed to a known value, such as a logic value of "0" (low), that is used to calibrate the measurements taken by measurement circuit 122. During fabrication, both the measured cell 116 and the zero reference cell 120 are measured for their value of an electrical characteristic. The ratio of the values from the measured cell 116 and reference cell 120 is encoded into the analog information cells 118 as the "factory-measured" value of the electrical characteristic.

After fabrication, during normal operation in the field when the authentication system 100 receives a replaceable supply device 104, the authentication algorithm 108 determines if the device 104 is authentic in a manner similar to that discussed above. However, in this embodiment the authentication algorithm 108 executes to control the measurement circuit 122 to measure the value of the electrical characteristic for both the measured cell 116 and the reference cell 120. The algorithm 108 determines the ratio of the values from the measured cell 116 and reference cell 120 and uses this ratio as a "field-measured" value of the electrical characteristic. As in the previously discussed embodiment, if the field-measured value (i.e., a ratio of electrical characteristic values measured in the field) matches the factory-measured value (i.e., a ratio of electrical characteristic values measured during fabrication), the authentication algorithm 108 authenticates the replaceable supply device. If the values do not match, however, the authentication algorithm 108 provides a notification that the replaceable supply device 104 is defective, damaged, or otherwise not authentic.

Figure 3:
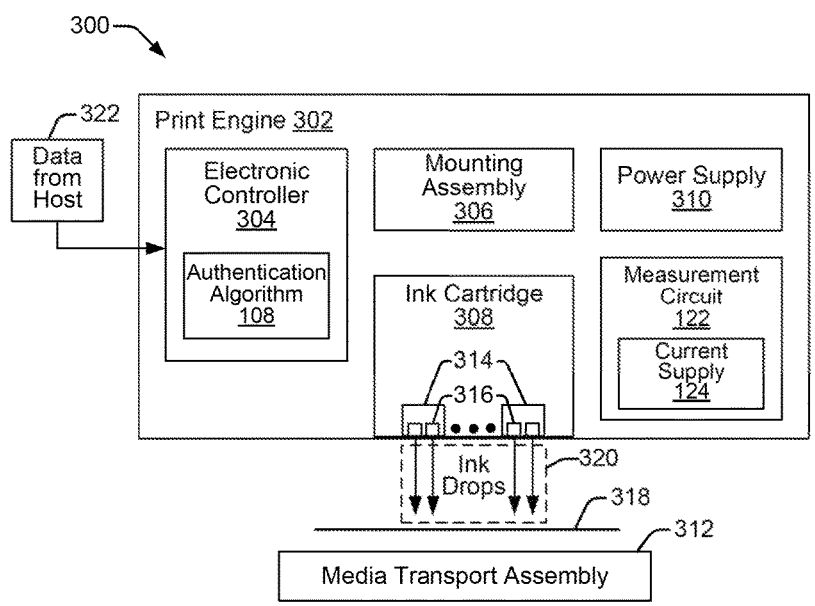
FIG. 3 shows an authentication system embodied as an inkjet printing system, according to an embodiment.

FIG. 3 shows an authentication system 100 embodied as an inkjet printing system 300, according to an embodiment of the disclosure. In one embodiment, the inkjet printing system 300 includes a print engine 302 having an electronic controller 304, a mounting assembly 306, one or more replaceable supply devices 104 embodied as ink cartridges 308, and at least one power supply 310 that provides power to the various electrical components of inkjet printing system 300. An ink cartridge 308 includes one or more printheads 314 each having nozzles 316. The print engine 302 also includes a measurement circuit 122 with a current supply 124, and an authentication algorithm 108 stored and executable on controller 304. Printing system 300 additionally includes media transport assembly 312.

Figure 4:
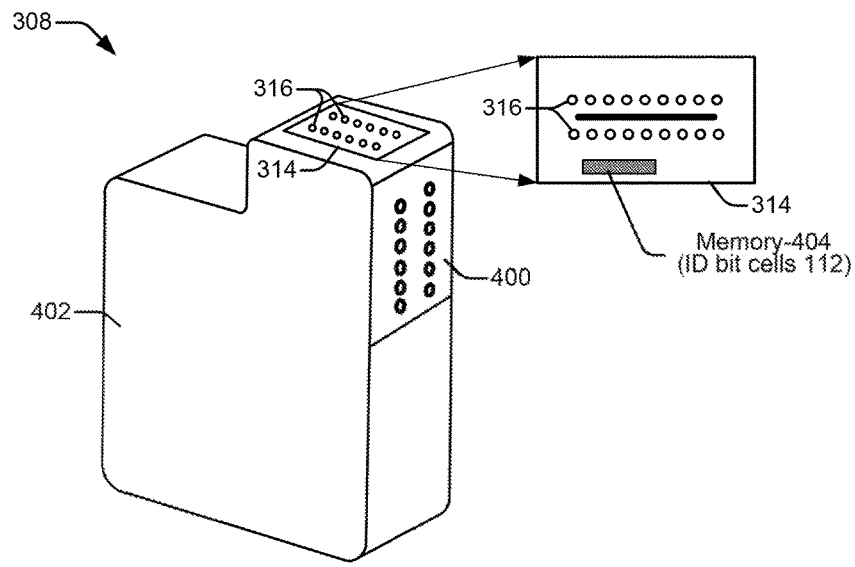
FIG. 4 shows a perspective view of an example inkjet cartridge, according to an embodiment.

FIG. 4 shows a perspective view of an example inkjet cartridge 308 (i.e., a replaceable supply device 104), according to an embodiment of the disclosure. In addition to one or more printheads 314, inkjet cartridge 308 includes a group of electrical contacts 400 and an ink (or other fluid) supply chamber 402. In some implementations cartridge 308 may have a supply chamber 402 that stores one color of ink, and in other implementations it may have a number of chambers 402 that each store a different color of ink. Electrical contacts 400 carry electrical signals from controller 304 to nozzles 316 on printhead 314 to cause the ejection of drops. Electrical contacts 400 also carry electrical signals to controller 304 from ID bit memory cells 112 in a memory 404 of the printhead 314. In this respect, printhead 314 serves as a data storage chip 110 with a memory 404 that includes ID bit memory cells 112 that function in a manner similar to that discussed above regarding the authentication system 100 of FIGS. 1 and 2.

More specifically, referring generally to FIGS. 2 and 4, during fabrication of a printhead 314, the analog value of a physical parameter such as an electrical characteristic is measured for a measured cell 116 within the string of ID bit memory cells 112 on memory 404 of the printhead 314. In one embodiment, this "factory-measured" value of the electrical characteristic of measured cell 116 is encoded directly into the analog information cells 118 of memory 404. In an alternate embodiment, a mathematical variation of the value of the electrical characteristic for measured cell 116 is encoded into the analog information cells 118 as the "factory-measured" value. One example of such a mathematical variation of the electrical characteristic value is a ratio of this value with respect to the same value measured for a zero reference cell 120, as previously discussed. In this alternate embodiment, during fabrication, both the measured cell 116 and the zero reference cell 120 are measured for their value of an electrical characteristic. The ratio of the values from the measured cell 116 and reference cell 120 is encoded into the analog information cells 118 as the "factory-measured" value of the electrical characteristic. In either embodiment, the factory-measured value of the electrical characteristic encoded into the analog information cells 118 provides an analog serial number that is uniquely associated with the printhead 314 of the particular inkjet cartridge 308 in which the chip is integrated.

Referring to FIGS. 3 and 4, printhead 314 ejects drops of ink or other fluid through a plurality of orifices or nozzles 316 toward a print medium 318 so as to print onto print medium 318. Print media 318 can be any type of suitable sheet or roll material, such as paper, card stock, transparencies, Mylar, polyester, plywood, foam board, fabric, canvas, and the like. Printhead 314 can be configured to eject ink through nozzles 316 in a variety of ways. For example, a thermal inkjet printhead ejects drops from a nozzle by passing electrical current through a heating element to generate heat and vaporize a small portion of the ink within a firing chamber. The vapor bubble forces a drop of ink through the nozzle 316. In another example, a piezoelectric inkjet printhead uses a piezoelectric material actuator to generate pressure pulses that force ink drops out of a nozzle. Nozzles 316 are typically arranged in one or more columns or arrays along printhead 314 such that properly sequenced ejection of ink from nozzles 316 causes characters, symbols, and/or other graphics or images to be printed on print media 318 as inkjet cartridge 308 and print media 318 are moved relative to each other.

Mounting assembly 306 positions inkjet cartridge relative to media transport assembly 312, and media transport assembly 312 positions print media 318 relative to inkjet cartridge 308. Thus, a print zone 320 is defined adjacent to nozzles 316 in an area between inkjet cartridge 308 and print media 318. In one embodiment, print engine 302 is a scanning type print engine 302. As such, mounting assembly 306 includes a carriage for moving inkjet cartridge 308 relative to media transport assembly 312 to scan print media 318. In another embodiment, print engine 302 is a non-scanning type print engine 302. As such, mounting assembly 306 fixes inkjet cartridge 308 at a prescribed position relative to media transport assembly 312 while media transport assembly 312 positions print media 318 relative to inkjet cartridge 308.

Electronic controller 304 typically includes components of a standard computing system such as a processor, memory, firmware, and other printer electronics for communicating with and controlling inkjet cartridge 308, mounting assembly 306, and media transport assembly 312. Electronic controller 304 receives data 322 from a host system, such as a computer, and temporarily stores the data 322 in a memory. Typically, data 322 is sent to inkjet printing system 300 along an electronic, infrared, optical, or other information transfer path. Data 322 represents, for example, a document and/or file to be printed. As such, data 322 forms a print job for inkjet printing system 300 that includes one or more print job commands and/or command parameters. Using data 322, electronic controller 304 controls inkjet cartridge 308 to eject ink drops from nozzles 316. Thus, electronic controller 304 defines a pattern of ejected ink drops which form characters, symbols, and/or other graphics or images on print medium 318. The pattern of ejected ink drops is determined by the print job commands and/or command parameters from data 322.

In one embodiment, electronic controller 304 executes authentication algorithm 108 to authenticate inkjet cartridge 308. In a manner similar to that discussed above regarding the authentication system 100 of FIG. 1, the authentication algorithm 108 executing on controller 304 controls measurement circuit 122 to measure the value of an electrical characteristic of a measured cell 116 within the string of ID bit memory cells 112 in memory 404 on printhead 314. Thus, as discussed above with respect to FIG. 2, the measurement circuit 122 measures the value of an electrical characteristic of the measured cell 116 during normal operation in the field. The algorithm 108 locates the address of the measured cell 116 by reading the address from address pointer cells 114. The algorithm 108 then controls the measurement circuit 122 to supply current from current supply 124 to the measured cell 116, and to measure the value of the same electrical characteristic of the measured cell 116 that was previously measured and encoded into the analog information cells 118 as a "factory-measured" value during fabrication of the printhead 314. Thus, the algorithm 108 determines a "field-measured" value to compare with the previously encoded "factory-measured" value. In an alternate embodiment, the algorithm 108 determines a mathematical variation of the value of the electrical characteristic for the measured cell 116 to compare with the same mathematical variation previously encoded into the analog information cells 118 as the "factory-measured" value. As discussed above, one example of such a mathematical variation of the electrical characteristic value is a ratio of this value with respect to the same value measured for a zero reference cell 120.

In either embodiment, the algorithm 108 compares a "field-measured" value of an electrical characteristic of measured cell 116 (i.e., either the direct value of the measured electrical characteristic, or a mathematical variation thereof) with a previously encoded "factory-measured" value of the same electrical characteristic of measured cell 116 (i.e., either the direct value of the measured electrical characteristic, or a mathematical variation thereof). If the field-measured value matches the factory-measured value (i.e., within a given tolerance level), the authentication algorithm 108 authenticates the inkjet cartridge 308. If the values do not match, however, the authentication algorithm 108 provides a notification (e.g., through a user interface of the printer system 300) that the inkjet cartridge 308 is defective, damaged, or otherwise not authentic. In this way, the analog value of an electrical characteristic measured for a particular memory cell within the ID bit string on a printhead 314 memory 404 serves as an analog serial number for an inkjet cartridge 308 that uniquely identifies the inkjet cartridge 308, enabling verification of the authenticity of the cartridge 308.

Figure 5:
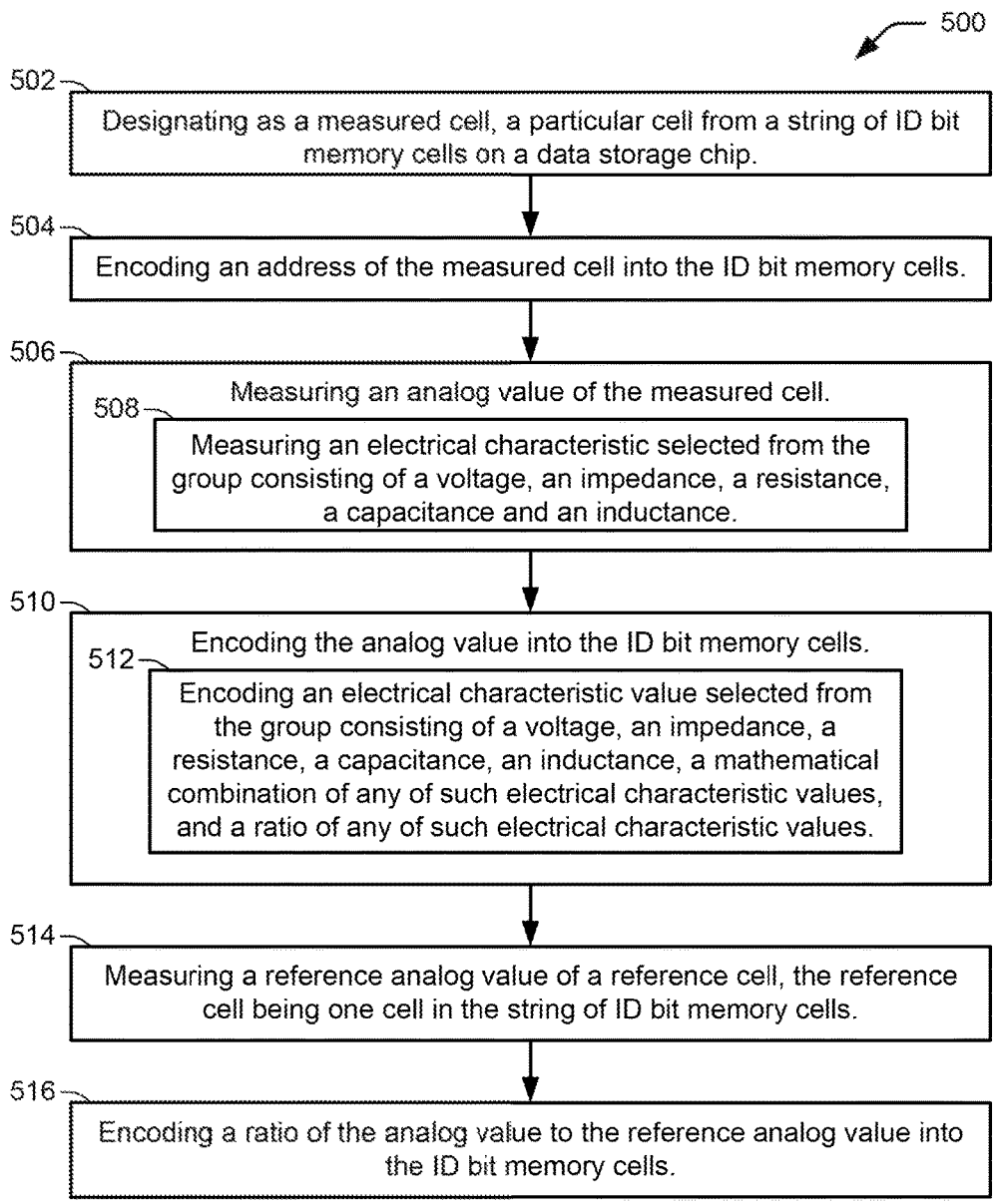
FIGS. 5 and 6 show flowcharts illustrating example methods of authentication, according to embodiments

FIG. 5 shows a flowchart of example methods of authentication 500, according to embodiments of the disclosure. Method 500 is associated with the embodiments discussed herein with respect to FIGS. 1-4. Although the steps of method 500 are presented in a particular order, the order presented is not intended to limit the order in which the steps of method 500 can be implemented. That is, the steps of method 500 may be implemented in different orders as would be apparent to one skilled in the art. Furthermore, the steps of method 500 provide more than one possible variation of a method of authentication. Thus, methods of authentication may be implemented without using all of the steps presented in method 500.

Method 500 begins at block 502 with designating as a measured cell, a particular memory cell from a string of identification (ID) bit memory cells on a data storage chip. The particular cell is designated as the measured cell during fabrication of the data storage chip. The data storage chip 110 may be, for example, integrated within a supply device of an authentication system. In a more specific example, the data storage chip 110 may be a printhead 314 on an inkjet cartridge 308 of a printing system 300. The method 500 continues at block 504 with encoding an address of the measured cell into the ID bit memory cells. At block 506, the method 500 continues with measuring an analog value of the measured cell. In one implementation, as shown at block 508, measuring an analog value can include measuring an electrical characteristic of the measured cell. The electrical characteristic can be, for example, a characteristic selected from the group consisting of a voltage, an impedance, a resistance, a capacitance and an inductance.

At block 510 of method 500, the analog value is encoded into the ID bit memory cells. In one implementation, as shown at block 512, encoding the analog value into the ID bit memory cells can include encoding an electrical characteristic value selected from the group consisting of a voltage, an impedance, a resistance, a capacitance, an inductance, a mathematical combination of any of such electrical characteristic values, and a ratio of any of such electrical characteristic values. In an alternate embodiment, a reference analog value of a reference cell is also measured, as shown at block 514 of method 500. The reference cell comprises one cell within the string of ID bit memory cells. In this embodiment a ratio of the analog value to the reference analog value is encoded into the ID bit memory cells. In both embodiments, the analog value and the ratio of analog values serve as an analog serial number encoded in a supply device's data storage chip that contains information about a specific physical parameter of the chip that uniquely identifies the supply device via the chip.

Figure 6:
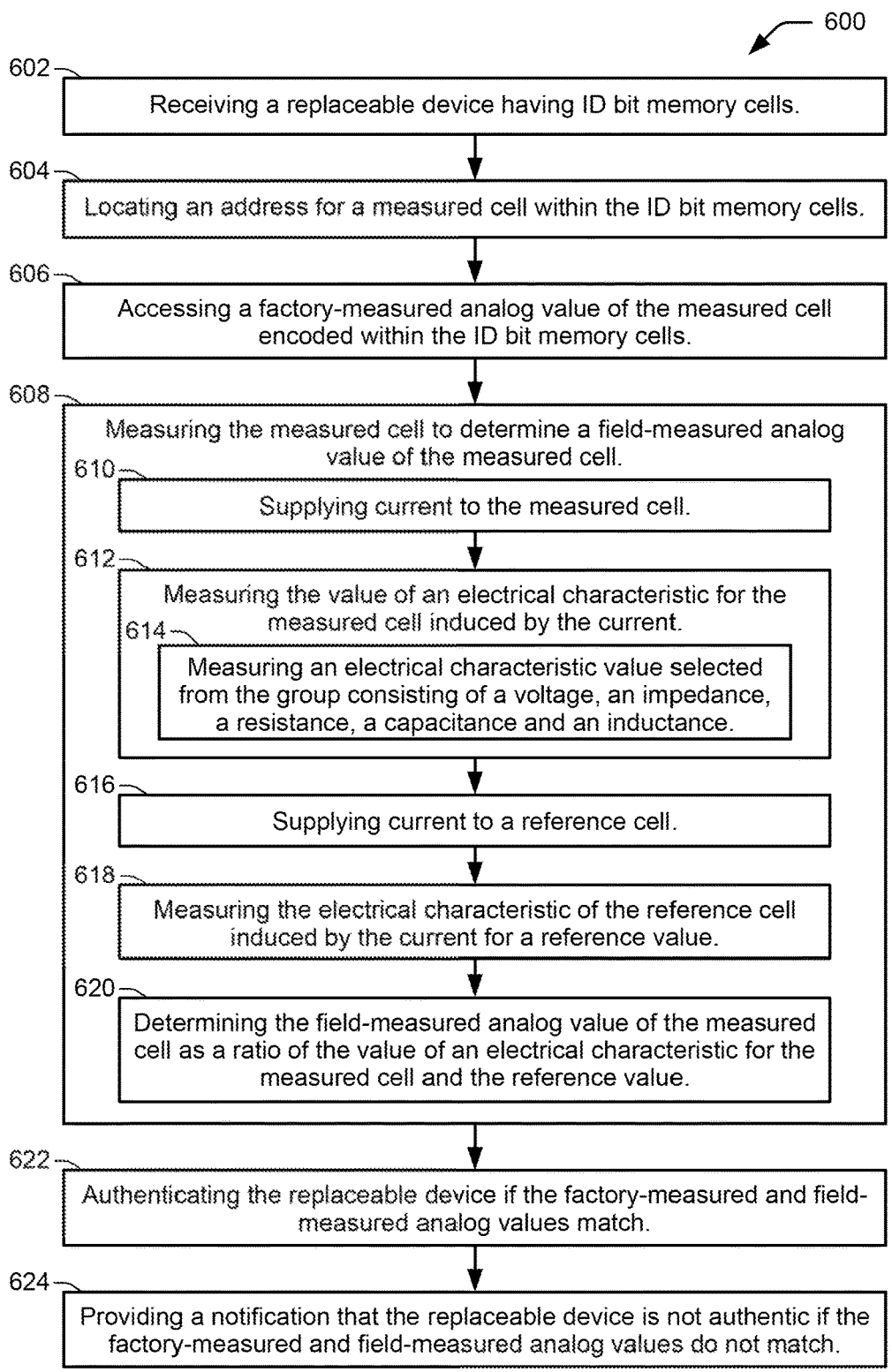

FIG. 6 shows a flowchart of example methods of authentication 600, according to embodiments of the disclosure. Method 600 is associated with the embodiments discussed herein with respect to FIGS. 1-4. Although the steps of method 600 are presented in a particular order, the order presented is not intended to limit the order in which the steps of method 600 can be implemented. That is, the steps of method 600 may be implemented in different orders as would be apparent to one skilled in the art. Furthermore, the steps of method 600 provide more than one possible variation of a method of authentication. Thus, methods of authentication may be implemented without using all of the steps presented in method 600.

Method 600 begins at block 602 with receiving a replaceable supply device having ID bit memory cells. The replaceable device can be for example, and inkjet cartridge that is replaceable within an inkjet printing, system. At block 604, the method 600 continues with locating an address for a measured cell within the ID bit memory cells. At block 606, a factory-measured analog value of the measured cell is accessed. The factory-measured analog value is a value that was previously measured at the factory during fabrication and encoded within the ID bit memory cells of a data storage chip on the replaceable supply device.

At block 608, the method 600 continues with measuring the measured cell to determine a field-measured analog value of the measured cell. In one implementation, measuring the measured cell can include supplying current to the measured cell and measuring the value of an electrical characteristic for the measured cell that is induced by the current, as shown at blocks 610 and 612, respectively. Measuring the value of an electrical characteristic can include measuring an electrical characteristic value selected from the group consisting of a voltage, an impedance, a resistance, a capacitance and an inductance, as shown in block 614. In another implementation, measuring the measured cell can also include supplying current to a reference cell and measuring the electrical characteristic of the reference cell that is induced by the current for a reference value, as shown at blocks 616 and 618. In this implementation, as shown at block 620, the field-measured analog value of the measured cell is determined as a ratio of the value of an electrical characteristic for the measured cell and the reference value.

The method 600 continues at block 622 with authenticating the replaceable device if the factory-measured and field-measured analog values match. As shown at block 624, the method 600 continues with providing a notification that the replaceable device is not authentic if the factory-measured and field-measured analog values do not match. The notification is provided, for example, through a user interface of an authentication system such as a printing system.

What is claimed is:

1. An authentication system having an electrically-measurable analog electrical characteristic, comprising:
 a supply device having a one-time programmable data storage chip with identification (ID) bit memory cells programmed to identify the supply device, the ID bit memory cells comprising:
  a measured cell located at a predetermined position within the data storage chip and having an analog electrical characteristic factory-measured during fabrication of the data storage chip by applying a current to the measured cell,
  pointer cells factory-programmed during fabrication of the data storage chip to store predetermined address information that points to the measured cell within the data storage chip,
  a reference cell located at a predetermined position within the data storage chip and having a reference value; and
  analog cells factory-programmed during fabrication of the data storage chip to store factory-measured analog information about the measured cell, wherein the factory-measured analog information comprises a ratio of the factory-measured analog electrical characteristic of the measured cell and the reference value.

2. An authentication system as in claim 1, further comprising:
 a base unit to receive the supply device;
 a controller integrated into the base unit; and
 an authentication algorithm executable on the controller to locate the measured cell using the address information, measure the measured cell for field-measured analog information, compare the factory-measured analog information and the field-measured analog information, and authenticate the supply device if the factory-measured and field-measured analog information match.

3. An authentication system as in claim 2, further comprising a measurement circuit to measure analog electrical characteristic of the measured cell.

4. An authentication system as in claim 3, wherein the electrical characteristic is selected from the group consisting of a voltage, an impedance, a resistance, a capacitance, an inductance, a mathematical combination of any of such electrical characteristics, and a ratio of any of such electrical characteristics.

5. An authentication system as in claim 3, wherein
 the authentication algorithm is to determine the field-measured analog information from a ratio of a field-measured value of the electrical characteristic of the measured cell and a field-measured reference value.

6. An authentication system as in claim 2, wherein the base unit comprises a printing system and the supply device comprises an inkjet cartridge.

7. An authentication system as in claim 2, wherein the authentication algorithm is to supply current from a current supply to the measured cell to measure the measured cell for the field-measured analog information.

8. An authentication system as in claim 2, wherein the authentication algorithm is to:
measure the reference cell to acquire a field-measured reference value; and
determine a ratio of the field-measured analog electrical characteristic and the field measured reference value.

9. An authentication system as in claim 1, wherein the ID bit memory cells are selected from the group consisting of MROM cells, PROM cells, and fuses.

10. An authentication system as in claim 1, wherein an address location of the measured cell within the ID bit memory cells differs among data storage chips.

11. An authentication system as in claim 1, wherein an address location of the pointer cells within the ID bit memory cells differs among data storage chips.

12. An authentication system as in claim 1, wherein the analog cells store information for multiple factory-measured analog electrical characteristics of the measured cell.

13. An ink cartridge having an electrically-measurable analog electrical characteristic, comprising:
a one-time programmable data storage chip having identification (ID) bit memory cells programmed to identify the ink cartridge, the chip including:
a measured cell located at a predetermined position within the data storage chip and having an analog electrical characteristic factory-measured during fabrication of the data storage chip by applying a current to the measured cell,
pointer cells factory-programmed during fabrication of the data storage chip to store predetermined address information that points to the measured cell within the data storage chip,
a reference cell located at a predetermined position within the data storage chip and having a reference value; and
analog cells factory-programmed during fabrication of the data storage chip to store factory-measured analog information about the measured cell, wherein the factory-measured analog information comprises a ratio of the factory-measured analog electrical characteristic of the measured cell and the reference value.

14. An ink cartridge as in claim 13, wherein the
reference cell is measurable in the field by a measurement circuit applying a current to the measured cell to provide an analog reference value of the electrical characteristic value.

15. An ink cartridge as in claim 14, wherein the electrical characteristic is selected from the group consisting of a voltage, an impedance, a resistance, a capacitance, an inductance, a mathematical combination of any of such electrical characteristics, and a ratio of any of such electrical characteristics.

16. An ink cartridge as in claim 13, wherein the reference cell is programmed to a known logic value.

17. An ink cartridge as in claim 13, wherein the ID bit memory cells are selected from the group consisting of MROM cells, PROM cells, and fuses.

18. An ink cartridge as in claim 13, wherein an address location of the measured cell within the ID bit memory cells differs among data storage chips.

19. An ink cartridge as in claim 13, wherein an address location of the pointer cells within the ID bit memory cells differs among data storage chips.

20. An ink cartridge as in claim 13, wherein the measured cell is measurable upon field-installation of the ink cartridge in a printer to yield field-measured analog information for comparison to the stored factory-measured analog information so as to authenticate the ink cartridge.

21. An ink cartridge as in claim 13, wherein at least one of the analog cells is not at an adjacent address in the data storage chip to any other of the analog cells.

22. An ink cartridge as in claim 13, wherein the reference cell is measurable upon field-installation of the ink cartridge in a printer to yield field-measured reference value for comparison to the stored factory-measured analog information so as to authenticate the ink cartridge.

23. An ink cartridge having an electrically-measurable analog electrical characteristic, comprising:
a one-time programmable data storage chip having identification (ID) bit memory cells programmed to identify the ink cartridge, the chip including:
a measured cell located at a predetermined position within the data storage chip and having an analog electrical characteristic factory-measured during fabrication of the data storage chip by a measurement circuit external to the ink cartridge that applies a current to the measured cell,
pointer cells factory-programmed during fabrication of the data storage chip to store predetermined address information that points to the measured cell within the data storage chip,
a reference cell located at a predetermined position within the data storage chip and having a reference value, and
analog cells factory-programmed during fabrication of the data storage chip to store factory-measured analog information about the measured cell, wherein the factory-measured analog information comprises a ratio of the factory-measured analog electrical characteristic of the measured cell and the reference value.

24. An ink cartridge as in claim 23, wherein the
reference cell has an analog reference electrical characteristic measurable by the measurement circuit to obtain the reference analog electrical characteristic.

25. An ink cartridge as in claim 24, wherein at least one of the analog cells is not at an adjacent address in the data storage chip to any other of the analog cells.

* * * * *